3,136,514
ACCESSORIES FOR CHRISTMAS TREES
Stanley J. Rzepela, 3027 Edgemont St.,
Philadelphia 34, Pa.
Filed Jan. 6, 1961, Ser. No. 81,111
5 Claims. (Cl. 248—47)

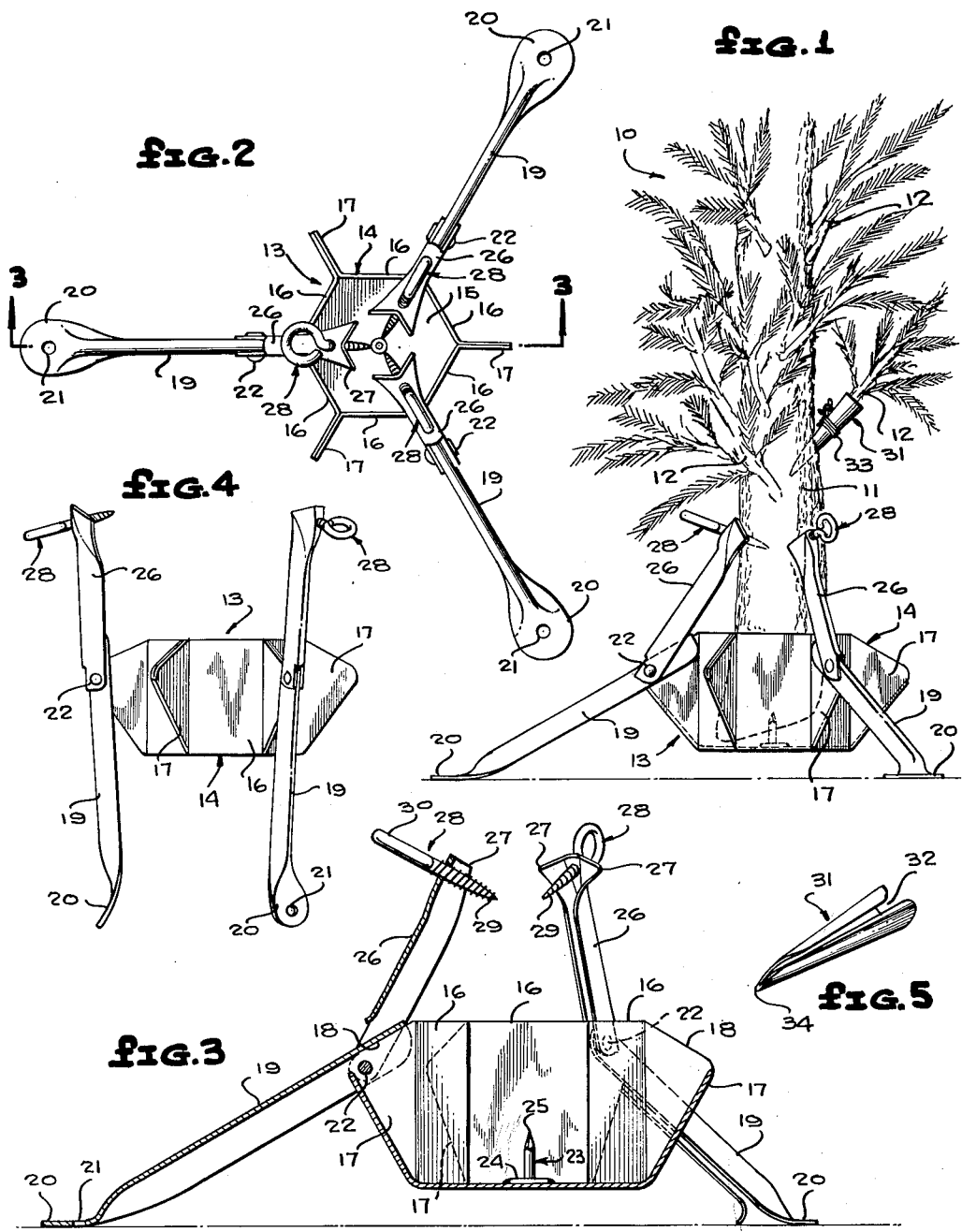

This invention relates in general to new and useful improvements in accessories for Christmas trees, and more particularly to a novel Christmas tree stand.

The primary object of this invention is to provide a novel Christmas tree stand which is of a rigid construction and at the same time is formed of hinged components whereby it may be folded for storage.

Another object of this invention is to provide a novel Christmas tree stand including a pan adapted to hold water for watering a Christmas tree, a plurality of supports pivotally connected to the tree stand for mounting the pan in spaced relation above a support, and a plurality of arms pivotally connected to the pan and having means for securement to a tree.

Still another object of this invention is to provide a novel Christmas tree stand including a watering pan, supports depending from the pan and tree securing arms projecting above the pan, the supports and the arms being disposed in sets with each set including one arm and one support with the arm and support of each set being aligned and connected to the pan with a single pivot pin.

Another object of this invention is to provide a novel means for securing a Christmas tree to a watering panel, which means may be quickly and readily secured to a tree to provide a rigid connection between the tree and the pan.

A further object of this invention is to provide a novel Christmas tree stand which may be readily and inexpensively formed of sheet metal, the tree stand including a watering pan which is formed of a single sheet of metal having side walls separated by projecting folded ears, and sheet metal supports and tree securing arms formed of sheet metal secured to certain of the ears Yet another object of this invention is to provide a novel attachment for securing limbs to a Christmas tree, which attachment may be readily driven into a tree and to which a limb may be readily secured.

With the above, and other objects in view that will hereinafter appear, the nature of the invention will be more clearly understood by reference to the following detailed description, the appended claims and the several views illustrated in the accompanying drawing.

In the drawing:

FIGURE 1 is an elevational view of a lower portion of a Christmas tree and shows the tree supported by the tree stand which is the subject of this invention, the tree also having an added limb secured thereto by the limb attachment.

FIGURE 2 is a plan view of the tree stand with the tree removed therefrom.

FIGURE 3 is an enlarged vertical sectional view taken along the line 3—3 of FIGURE 2 and shows the details of the tree stand.

FIGURE 4 is an elevational view of the tree stand in its folded state.

FIGURE 5 is a perspective view of the limb attachment.

Reference is now made to the drawings in detail wherein there is illustrated the lower portion of a Christmas tree 10 having the usual trunk 11 and limbs 12. In accordance with this invention, the tree 10 is supported by a tree stand, generally referred to by the numeral 13.

The tree stand 13 includes a watering pan, generally referred to by the numeral 14. The pan 14 is formed from a single sheet of metal and includes a base 15, which is illustrated as having a hexagonal outline, and upstanding side walls 16 extending upwardly around the periphery of the base 15. Adjacent ones of the side walls 16 are connected together by ears 17 which are of double thickness and integrally connected to vertical edges of adjacent side walls 16. Each ear 17 is of a triangular outline and has a downwardly and outwardly sloping upper edge 18. The pan 14, being devoid of joints, is free of leaks.

In the illustrated form of the invention, the pan 14 is supported by elongated supports 19 secured to alternating ones of the ears 17. The supports 19 are folded from strips of sheet metal, and the major portion of each support 19 is of a channel shaped cross section and terminates at the lower end thereof in a flattened foot 20. Each foot has an opening 21 therethrough for receiving a fastener (not shown) to firmly anchor the support.

The upper portion of each support 19 is telescoped down over the upper portion of an associated one of the ears 17 and is piovtally connected thereto by a pivot pin 22. When the supports 19 are in their extended pan supporting position, the upper portions of the supports 19 engage the upper edges 18 of the associated ears 17 to limit downward movement of the pan 14 and to support the pan 14 in an elevated position.

The tree 10 is secured to the pan 14 by a fastener 23. The fastener 23 is located at the center of the pan 14 and has an enlarged head 24 which is suitably secured to the base 15. When the tree 10 is secured to the pan 14, the fastener 23, which has a pointed upper end 25, is driven into the base of the trunk 11.

The tree 10 is also secured to the pan 14 by a plurality of arms 26. The number of arms 26 normally corresponds to the number of supports 19, and the arms 26 being secured to the pan by the pivot pins 22. Each of the arms 26 is elongated and is of a channel shaped cross section, each arm being folded from sheet metal. The lower end of each arm 26 is bifurcated and telescoped over the associated support 19 with the respective pivot pin 22 extending therethrough.

The upper end of each arm 26 is partially flattened to provide two tree engaging prongs 27. A fastener 28 is passed through each arm upper end for engagement with the tree trunk. The fastener 28 has a tapered threaded body 29 for self threading into wood and an enlarged head 30. The head 30 is disposed outermost and both presents the drawing of the fastener 28 through the arm 26 and facilitates the turning of the fastener 28. In FIGURE 1, the arms 26 are illustrated as being secured to the tree trunk 11 by the fasteners 28.

Reference is now made to FIGURE 4 wherein the tree stand 13 is shown in its folded state. When the tree stand 13 is folded, the arm 26 and support 19 of each set are disposed in alignment and parallel to the axis of the pan 14, thus requring a minimum of space for storage and packaging.

In FIGURES 1 and 5 an attachment 31 for securing a tree limb 12 to the tree trunk 11 is shown. The attachment 31 is folded from sheet metal and includes a trough like body 32 for the reception of an end of the tree limb, the tree limb being secured to the attachment by wrappings 33 of wire or string. The attachment 31 also includes a pointed end 34 which permits the driving of the attachment into the tree trunk 11.

From the foregoing, it will be apparent that there has been devised suitable structure for obtaining the desired end. However, while a preferred embodiment of the invention has been disclosed, it is to be understood that minor modifications may be made in the invention within the spirit or scope of the appended claims.

What is claimed as new:

1. A stand for a Christmas tree comprising a watering pan having projecting ears spaced about the periphery thereof, said ears having downwardly inclined upper edges, elongated legs extending downwardly and outwardly from certain of said ears, each of said legs being pivotally connected to its ear at a point spaced downwardly from the upper ends of said inclined upper edges, a surface of each of said legs above said pivotal connection movable into engagement with its related inclined upper edge when said legs are extended, and separate tree securing arms extending from said certain of said ears and pivotally connected thereto, said arms having tree penetrating means at the end thereof remote from said ears.

2. A stand for a Christmas tree comprising a watering pan having projecting ears spaced about the periphery thereof, said ears having downwardly inclined upper edges, elongated legs extending downwardly and outwardly from certain of said ears, each of said legs being pivotally connected to its ear at a point spaced downwardly from the upper ends of said inclined upper edges, said legs each being U-shaped in cross-section with the legs of said U being on oppoiste sides of its supporting ears, the bight of said U engaging said inclined upper edge when said legs are extended, and separate tree securing arms extending from said certain of said ears and pivotally connected thereto, said arms having tree penetrating means at the end thereof remote from said ears.

3. A stand as set forth in claim 2, wherein each of said tree securing arms is also U-shaped in cross-section, the legs of said U straddling its related elongated leg, each of said elongated legs and its corresponding tree securing arm being connected to its ear by a common pivot pin.

4. A stand for a Christmas tree comprising a watering pan having outwardly projecting ears spaced about the periphery thereof, each of said ears comprising a generally triangular fold of metal U-shaped in cross-section, the walls of said fold being close together, said ears further having downwardly inclined upper edges, elongated legs extending downwardly and outwardly from certain of said ears, each of said legs being pivotally connected to its ear at a point spaced downwardly from the upper end of said inclined upper edge, said legs each being U-shaped in cross-section with the legs of said U being on opposite sides of its supporting ear, the bight of said U engaging said inclined upper edge when said legs are extended, and separate tree securing arms extending from said certain of said ears and pivotally connected thereto.

5. A stand as set forth in claim 4, wherein each of said tree supporting arms is also U-shaped in cross-section, the legs of said U straddling its related elongated leg, each of said elongated legs and its corresponding tree securing arm being connected to its ear by a common pivot pin.

References Cited in the file of this patent

UNITED STATES PATENTS

| | | |
|---|---|---|
| 399,870 | Gaskill | Mar. 19, 1889 |
| 1,714,498 | Danner | May 28, 1929 |
| 2,107,638 | Lyons | Feb. 8, 1938 |
| 2,205,271 | Pleiss | June 18, 1940 |
| 2,229,378 | Gustafson | Jan. 21, 1941 |
| 2,238,134 | Schoen | Apr. 15, 1941 |
| 2,679,994 | Mellen | June 1, 1954 |
| 2,732,154 | Wilson | Jan. 24, 1956 |
| 2,933,274 | Mausolf | Apr. 19, 1960 |
| 3,045,959 | Herrington | July 24, 1962 |